Jan. 13, 1948. A. GARCIA 2,434,559
DISAPPEARING AUTOMOBILE WINDOW SCREEN
Filed Feb. 3, 1945 2 Sheets-Sheet 2
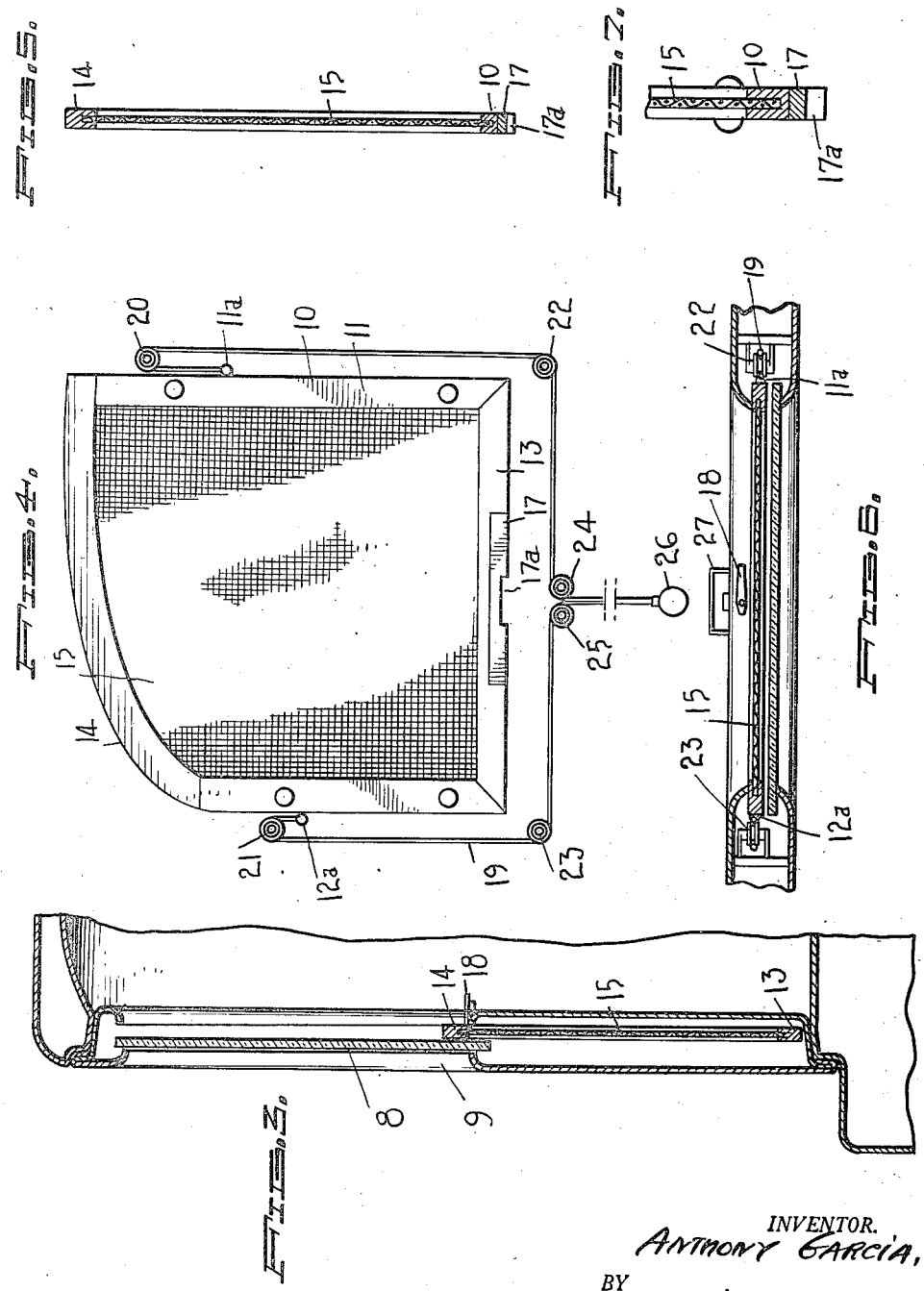
INVENTOR.
ANTHONY GARCIA,
BY
Carl Miller
ATTORNEY

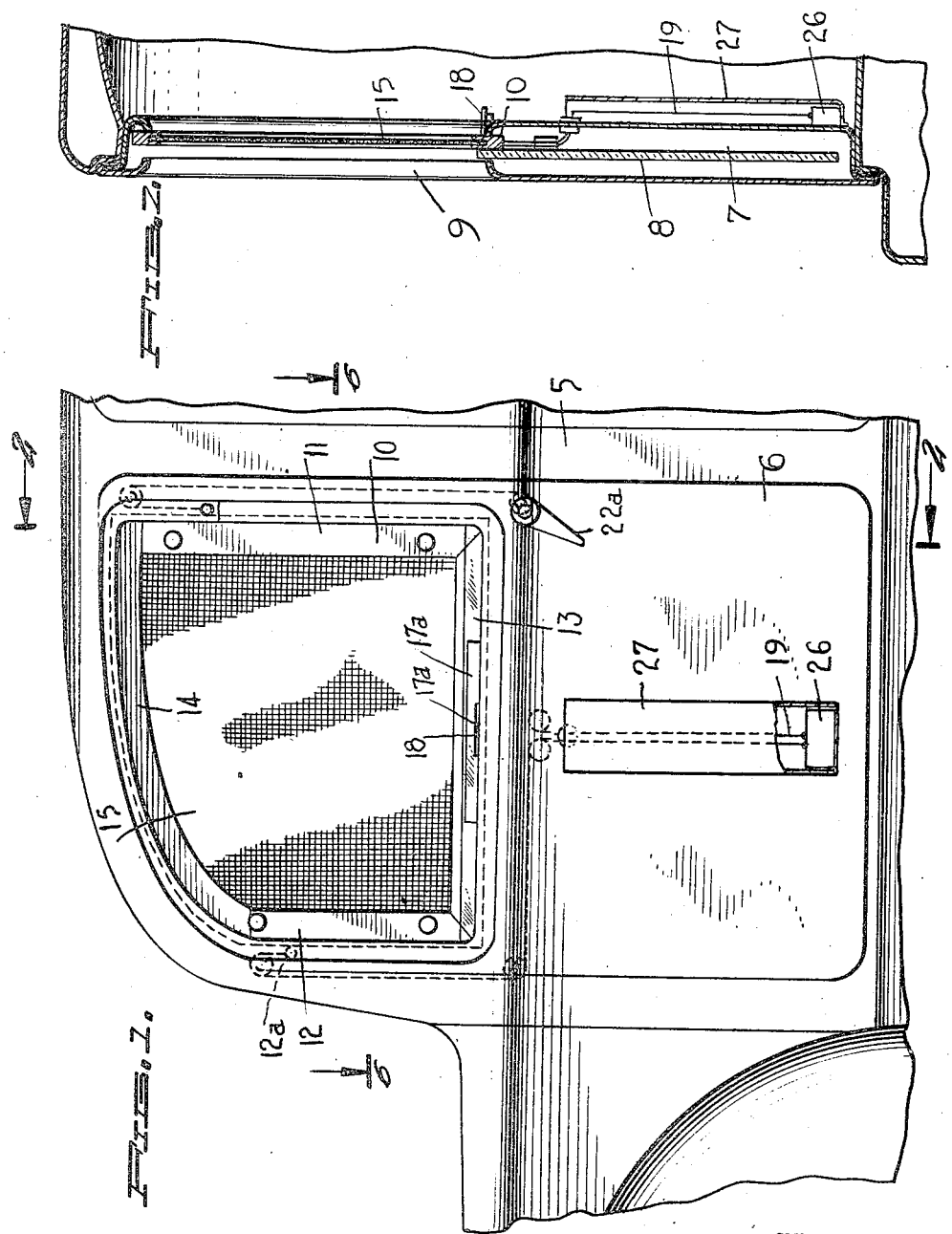

Patented Jan. 13, 1948

2,434,559

UNITED STATES PATENT OFFICE 2,434,559

DISAPPEARING AUTOMOBILE WINDOW SCREEN

Anthony Garcia, New York, N. Y.

Application February 3, 1945, Serial No. 575,990

1 Claim. (Cl. 160—37)

This invention relates to improvements in automobile window screens, and one of its objects is to provide a window screen for an automobile window and means for mounting the same so that it can be balanced for easy vertical movement from a door well to service position, and may be caused to disappear into the well when no longer required.

Another object of the invention is the provision of balancing means, which includes a series of pulleys, a flexible cord connected with the window screen and operating over the pulleys, and a single weight connected centrally to the cord or cable and arranged to move in the door well below the window screen.

With the above and other objects in view the invention embraces certain new and useful constructions, combinations and arrangements of parts, clearly described in the following specification, and fully illustrated in the following drawings, in which:

Fig. 1 is a side view of an automobile door and the related vehicle parts, showing the improved screen in a raised position.

Fig. 2 is a vertical sectional view, taken on line 2—2 of Fig. 1, looking in the direction of the arrows.

Fig. 3 is a similar vertical sectional view, showing the door glass slide raised and the screen slide lowered.

Fig. 4 is a side elevation of the screen slide and the pulley and weight means for balancing the same, shown detached from their installed positions.

Fig. 5 is a central vertical sectional view through the screen alone.

Fig. 6 is a detail horizontal sectional view, taken on line 6—6 of Fig. 1, looking in the direction of the arrows.

Fig. 7 is a fragmentary detail sectional view, enlarged, of the screen.

Referring to the accompanying drawings which illustrate the invention 5 designates an automobile body having a door 6 hinged thereto. This door is constructed with the usual well 7 in which the glass panel or slide 8 is adapted to disappear, for the purposes of service in closing the opening 9 above the well, and of exposing this opening for ventilation.

It is well known that many insects enter automobiles through open windows and drivers have been attacked by such insects, while driving fast moving automobiles, and as a result of the distracting effects of such insects, particularly bees and mosquitoes, many accidents have occurred, some of which have been fatal.

To avert accidents of this kind, and to protect drivers and passengers from the annoyance of dust, the attacks of insects, and unlawful entry through open windows, resulting in loss of clothing, luggage and other useful or valuable articles, I provide a movable screen 10, which is provided with a frame, consisting of the side bars 11 and 12, the bottom bar 13, and the top bar 14, which enclose the edges of the mesh or woven wire cloth 15. The top bar 14 is held in place by the screws 16, and can be removed and the wire cloth 15 dropped into the grooves' edges of the side bars and the bottom bar, and then the top bar connected to the upper ends of the side bars, which are reduced for this purpose.

The bottom bar 13 is provided with a weight 17, suitably connected thereto, and this weight is formed with a clearance 17a to receive a pivoted lever catch or latch 18, mounted for pivotal movement on the upper part of the door, but adjacent to the lower margin of the opening 9 thereof.

The side bars 11 and 12 are provided with screw or connector eyes 11a and 12a, to which the ends of the flexible cable or cord 19 are connected. A pulley 20 is located near the side bar 11 and a pulley 21 is located near the side bar 12, and these pulleys may be arranged in different elevations, as shown. The flexible cord or cable travels over the pulleys 22 and 23 arranged below the pulleys 20 and 21, and over the two pulleys 24 and 25 arranged midway of the sides of the door. A weight 26 is connected to the cord or cable to exert constant pressure upon the cord or cable to produce a balancing effect upon the whole screen slide, so that with little manual effort the screen may be lifted and lowered, when in an elevated position, back into the door well 27. The movement of the weight is equal to that of the screen slide. When the screen is in its highest position to close the door opening, the latch 18 may be shifted into engagement with the recess or clearance 17a and the screen will be retained in its elevated position.

It will be seen that my invention provides a safe protection for open door windows of automobile, but ventilation is permitted while the admission of insects, and large particles of dirt or debris is prevented.

It is understood that various changes in the details of construction, combination and arrangement of parts, clearly described in the preceding specification, and illustrated in the drawings, may be resorted to, within the scope of the claim of this application.

Having described my invention, I claim as new:

An automobile door having a body provided with a ventilation opening in the upper part thereof, a pair of pulleys arranged in the door on each side of the opening, one pulley of each pair of pulleys being arranged below the opening and one pulley being arranged near the upper end of the opening, a pair of pulleys located between the lowermost pulleys and midway thereof, a screen movable on the door to bridge the opening and provided with a rigid frame, a flexible cord connected to each side of the screen and movable over the uppermost side pulleys and trained over the lowermost side pulleys and over the intermediate pulleys and depending therefrom in a central position, a well on the door below the opening thereof, and a weight slidable in the well and connected to the lower ends of both flexible cords and adapted to balance the weight of the screen, whereby the downward motion of the screen will cause the weight to be elevated in the door well.

ANTHONY GARCIA.

REFERENCES CITED

The following references are of record in the file of this patent:

UNITED STATES PATENTS

| Number | Name | Date |
|---|---|---|
| 1,712,659 | Fridley | May 14, 1929 |
| 1,730,204 | Harris | Oct. 1, 1929 |

FOREIGN PATENTS

| Number | Country | Date |
|---|---|---|
| 156,171 | Germany | Nov. 15, 1904 |